US010279532B2

(12) United States Patent
Suyama et al.

(10) Patent No.: US 10,279,532 B2
(45) Date of Patent: *May 7, 2019

(54) BLOW MOLDING DEVICE

(71) Applicant: DISCMA AG, Zürich (CH)

(72) Inventors: Kenichi Suyama, Kanagawa (JP); Yuichi Okuyama, Kanagawa (JP)

(73) Assignee: DISCMA AG, Zürich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/500,669

(22) PCT Filed: Jul. 28, 2015

(86) PCT No.: PCT/JP2015/003782
§ 371 (c)(1),
(2) Date: Jan. 31, 2017

(87) PCT Pub. No.: WO2016/017152
PCT Pub. Date: Feb. 4, 2016

(65) Prior Publication Data
US 2017/0217077 A1 Aug. 3, 2017

(30) Foreign Application Priority Data

Jul. 31, 2014 (JP) ................................. 2014-156907

(51) Int. Cl.
*B29C 49/46* (2006.01)
*B29C 49/58* (2006.01)
(Continued)

(52) U.S. Cl.
CPC .............. *B29C 49/46* (2013.01); *B29C 49/08* (2013.01); *B29C 49/12* (2013.01);
(Continued)

(58) Field of Classification Search
CPC ............ B29C 49/46; B29C 2049/4664; B29C 2049/5875
See application file for complete search history.

(56) References Cited

U.S. PATENT DOCUMENTS

| 7,862,327 B2 | 1/2011 | Rousseau et al. |
| 7,871,259 B2 | 1/2011 | Linke et al. |
| 2017/0008215 A1* | 1/2017 | Suyama .................. B29C 49/46 |

FOREIGN PATENT DOCUMENTS

| CN | 101284418 A | 10/2008 |
| CN | 101432121 A | 5/2009 |

(Continued)

*Primary Examiner* — Robert B Davis
(74) *Attorney, Agent, or Firm* — Eric J. Sosenko; Jonathan P. O'Brien; Honigman LLP (57) ABSTRACT

A blow molding device in which pressure is accumulated in advance in a cylinder, which is used for providing pressurized an air space about a mouth of a preform to be molding into a container within a mold using a pressurized liquid. Pressure is also accumulated in advance in an accumulator. When a pressurized liquid is supplied into the preform, the opening-closing valve of the accumulator is opened to thereby apply the accumulated pressure within the accumulator to the liquid supplied into the preform, and the opening-closing valve is closed to thereby allow the accumulated pressure within the cylinder to pressurize the air space.

10 Claims, 8 Drawing Sheets

(51) Int. Cl.
| | | |
|---|---|---|
| *B29C 49/08* | (2006.01) | |
| *B29C 49/12* | (2006.01) | |
| *B67C 3/02* | (2006.01) | |
| *B29C 49/60* | (2006.01) | |
| *B29C 49/42* | (2006.01) | |
| B29L 31/00 | (2006.01) | |
| B29K 23/00 | (2006.01) | |
| B29K 67/00 | (2006.01) | |

(52) U.S. Cl.
CPC .......... *B29C 49/4289* (2013.01); *B29C 49/58* (2013.01); *B29C 49/60* (2013.01); *B67C 3/02* (2013.01); *B29C 2049/4664* (2013.01); *B29C 2049/5803* (2013.01); *B29C 2049/5875* (2013.01); *B29K 2023/12* (2013.01); *B29K 2067/003* (2013.01); *B29L 2031/7158* (2013.01)

(56) References Cited

FOREIGN PATENT DOCUMENTS

| JP | 2009-533290 A | 9/2009 |
|---|---|---|
| JP | 2010-531757 A | 9/2010 |
| JP | 2013-132861 A | 7/2013 |
| JP | 2013-208834 A | 10/2013 |

\* cited by examiner

BLOW MOLDING DEVICE

TECHNICAL FIELD

The present disclosure relates to a blow molding device that blow molds a bottomed tubular-shaped preform into a bottle, especially to such a device that uses a liquid as a pressurized fluid for blow molding.

BACKGROUND

Resin bottles, representatives of which are oriented polypropylene (OPP) bottles and polyethylene terephthalate (PET) bottles, are used in various fields, such as beverages, foods, cosmetics, and so forth. Such a bottle is typically formed in a predetermined shape by biaxially stretch blow molding a resin preform by using a blow molding device in a state where the resin preform is heated to a temperature at which a stretching effect may be achieved. The resin preform has been formed in a bottomed tubular shape by, for example, injection molding.

Known examples of such a blow molding device include the one that uses a pressurized liquid, instead of pressurized air, as the pressurized fluid that is supplied into the preform. As the liquid to be pressurized in this example, a content liquid, such as a beverage, a cosmetic product, and a pharmaceutical product, that is to be filled into the bottle as a final product may be used. By doing so, the process of filling the content liquid to the bottle may be omitted, and the production process and the configuration of the blow molding device may be simplified.

For example, JP 2013208834A describes a blow molding device including a blow molding mold to which a preform, after heated to a temperature at which the preform is stretchable, is fitted, a blow nozzle that is fitted to a tubular mouth portion of the preform fitted to the mold, a pressurized liquid supply unit configured to supply a pressurized liquid into the preform through the blow nozzle, and a stretching rod that is freely displaceable in upward and downward directions. By stretching the preform in the longitudinal (axial) direction with the stretching rod and also by stretching the preform in the lateral (radial) direction by supplying the pressurized liquid into the preform, the preform is molded into a bottle having a shape conforming to a cavity of the mold.

Furthermore, to prevent the tubular mouth portion of the preform from undergoing diameter increase and deformation due to the pressure of the liquid supplied into the preform and causing the liquid to leak to the outside from a gap defined between the tubular mouth portion and the blow nozzle, the blow molding device described in JP 2013208834A also supplies air pressurized by a cylinder or the like to air space defined for pressurizing an outside of a mouth and surrounding an outer circumference of the tubular mouth portion of the preform fitted to the mold. The supplied pressurized air presses the tubular mouth portion against an outer circumferential surface of the blow nozzle and prevents the diameter increase and deformation of the tubular mouth portion.

SUMMARY

A blow molding device as described above may employ a servo plunger-type plunger pump driven by, for example, a servo motor, as the pressurized liquid supply unit configured to supply the pressurized liquid into the preform. Using such a plunger pump as the pressurized liquid supply unit allows a metered amount of the liquid (content liquid) to be filled into the final bottle with high precision.

To enhance moldability (shaping characteristics) of the bottle obtained as a result of blow molding the preform according to the blow molding device, the liquid supplied into the preform needs to be pressurized by the plunger pump to a prescribed pressure within a short period of time.

However, in cases of a servo plunger-type plunger pump, a time period necessary for pressurizing the liquid to the prescribed pressure depends on the capability of the servo motor that actuates the plunger pump, and this time period cannot be less than the time it takes for the servo motor operating at the maximum rate, that is to say, to its fullest capability. This sometimes causes the situation where moldability of the bottle is not satisfactorily enhanced.

In the meantime, the following configuration may be considered to address the above unfavorable situation. That is to say, as a cylinder used to supply pressurized air to the air space, which is defined for pressurizing the outside of the mouth, a cylinder used for conversion to air for the outside of the mouth is used. The cylinder, which is used for conversion to air for the outside of the mouth, has one end that is in branch connection with a liquid flow path of the pressurized liquid and another end that is in connection with the air space, which is defined for pressuring the outside of the mouth. Furthermore, an opening-closing valve of the cylinder, which is used for conversion to air for the outside of the mouth, is disposed between the cylinder and the liquid flow path, and an opening-closing valve used for pressurizing air outside the mouth is disposed between the cylinder and the air space. The opening-closing valve of the cylinder, which is used for conversion to air for the outside of the mouth, and the opening-closing valve used for pressurizing air outside the mouth are closed in the state where pressure is accumulated in the cylinder in advance. Then, when the pressurized liquid is supplied from the pressurized liquid supply unit into the preform, the opening-closing valve of the cylinder, which is used for conversion to air for the outside of the mouth, and the opening-closing valve used for pressurizing air outside the mouth are opened. The pressure accumulated in the cylinder, which is used for conversion to air for the outside of the mouth, pressurizes the air space, which is defined for pressuring the outside of the mouth, and prevents the diameter increase and deformation of the tubular mouth portion of the preform. At the same time, the pressure accumulated in the cylinder, which is used for conversion to air for the outside of the mouth, is applied to the liquid flow path to reduce the time period necessary for pressurizing the liquid supplied into the preform to the prescribed pressure to less than the time period corresponding to the capability of the pressurized liquid supply unit.

However, the above configuration might pose the following problem. That is to say, as the pressure accumulated in the cylinder, which is used for conversion to air for the outside of the mouth, is applied to the liquid supplied into the preform, the pressure of the cylinder, that is, the pressure in the air space, which is defined for pressuring the outside of the mouth and which is pressurized by the cylinder, is decreased. This temporarily makes the pressure of the liquid supplied into the preform greater than the pressure in the air space, which is defined for pressuring the outside of the mouth, resulting in the diameter increase and deformation of the tubular mouth portion of the preform as a possible cause of leakage of the liquid from the gap defined between the tubular mouth portion and the blow nozzle.

The present disclosure is to solve the above problem, and the present disclosure is to provide a blow molding device that enhances moldability of the bottle by reducing the time period, necessary for pressurizing the liquid supplied into the preform to the prescribed pressure, to less than the time period corresponding to the capability of the pressurized liquid supply unit.

One of aspects of the present disclosure resides in a blow molding device that supplies a pressurized liquid into a bottomed tubular preform fitted to a mold used for blow molding and molds the preform into a shape conforming to a cavity of the mold, the blow molding device including: a blow nozzle fitted to a tubular mouth portion of the preform; a sealing body configured to open and close the blow nozzle; a pressurized liquid supply unit connected to the blow nozzle via a liquid flow path; a cylinder used for conversion to air for an outside of a mouth, the cylinder having one end that is in branch connection with the liquid flow path and another end that is in connection with air space defined for pressuring the outside of the mouth and surrounding an outer circumference of the tubular mouth portion of the preform fitted to the mold; an opening-closing valve of the cylinder, which is used for conversion to air for the outside of the mouth, disposed between the liquid flow path and the cylinder; an opening-closing valve used for pressurizing air outside the mouth and disposed between the air space, which is defined for pressuring the outside of the mouth, and the cylinder, which is used for conversion to air for the outside of the mouth; an accumulator that is in branch connection with the liquid flow path; and an opening-closing valve of the accumulator that is disposed between the liquid flow path and the accumulator. By actuating the pressurized liquid supply unit in a state where the sealing body and the opening-closing valve used for pressurizing air outside the mouth are closed and where the opening-closing valve of the cylinder, which is used for conversion to air for the outside of the mouth, is opened and by subsequently closing the opening-closing valve of the cylinder, pressure is accumulated in advance in the cylinder, and pressure is also accumulated in the accumulator in advance, with the opening-closing valve of the accumulator being closed. When the pressurized liquid is supplied into the preform through the blow nozzle by actuating the pressurized liquid supply unit and by opening the sealing body, the opening-closing valve used for pressurizing air outside the mouth is opened while the opening-closing valve of the cylinder, which is used for conversion to air for the outside of the mouth, remains closed to thereby allow the accumulated pressure within the cylinder to pressurize the air space, which is defined for pressuring the outside of the mouth, and the opening-closing valve of the accumulator is opened to thereby apply the accumulated pressure within the accumulator to the liquid supplied into the preform.

In the blow molding device according to the present disclosure, the pressure is preferably accumulated in the accumulator in advance, by bringing the opening-closing valve of the accumulator into an opened state at the time of accumulating the pressure in advance in the cylinder, which is used for conversion to air for the outside of the mouth, through the actuation the pressurized liquid supply unit and by subsequently closing the opening-closing valve of the accumulator.

The blow molding device according to the present disclosure preferably further includes a pressurizing unit that pressurizes the accumulator, wherein the pressure is accumulated in the accumulator in advance by the pressurizing unit.

In the blow molding device according to the present disclosure, the pressurized liquid supply unit preferably includes a servo plunger-type plunger pump.

According to the present disclosure, since the pressure is accumulated in the accumulator in advance and since, at the time of supplying the pressurized liquid into the preform, the liquid is pressurized not only by actuating the pressurized liquid supply unit but also by applying the accumulated pressure within the accumulator to the liquid, the time period necessary for pressurizing the liquid to the prescribed pressure is reduced to less than the time period corresponding to the capability of the pressurized liquid supply unit. Accordingly, moldability of the bottle obtained as a result of blow molding the preform is enhanced compared with cases where the liquid is pressurized solely by the pressurized liquid supply unit.

According to the present disclosure, since the pressure (air pressure) in the air space, which is defined for pressuring the outside of the mouth, is increased with use of the cylinder, which is used for conversion to air for the outside of the mouth and which has one end that is in branch connection with the liquid flow path and another end that is in connection with the air space, there is no need to additionally provide a driving unit or the like that drives a cylinder configured to increase the pressure in the air space. This simplifies the configuration of the blow molding device. Furthermore, the cylinder, which is used for conversion to air for the outside of the mouth, is provided as a separate system from the accumulator, which applies pressure to the liquid supplied into the preform, and is disconnected from the liquid flow path during the supply of the liquid into the preform. Accordingly, even though the accumulator is configured to pressurize the liquid supplied into the preform, the pressure that the cylinder, which is used for conversion to air for the outside of the mouth, applies to the air space, which is defined for pressuring the outside of the mouth, remains constant. This ensures that the diameter increase and deformation of the tubular mouth portion of the preform is prevented.

DETAILED DESCRIPTION

The present disclosure will be described in more detail below by illustration with reference to the drawings.

Figure 1:
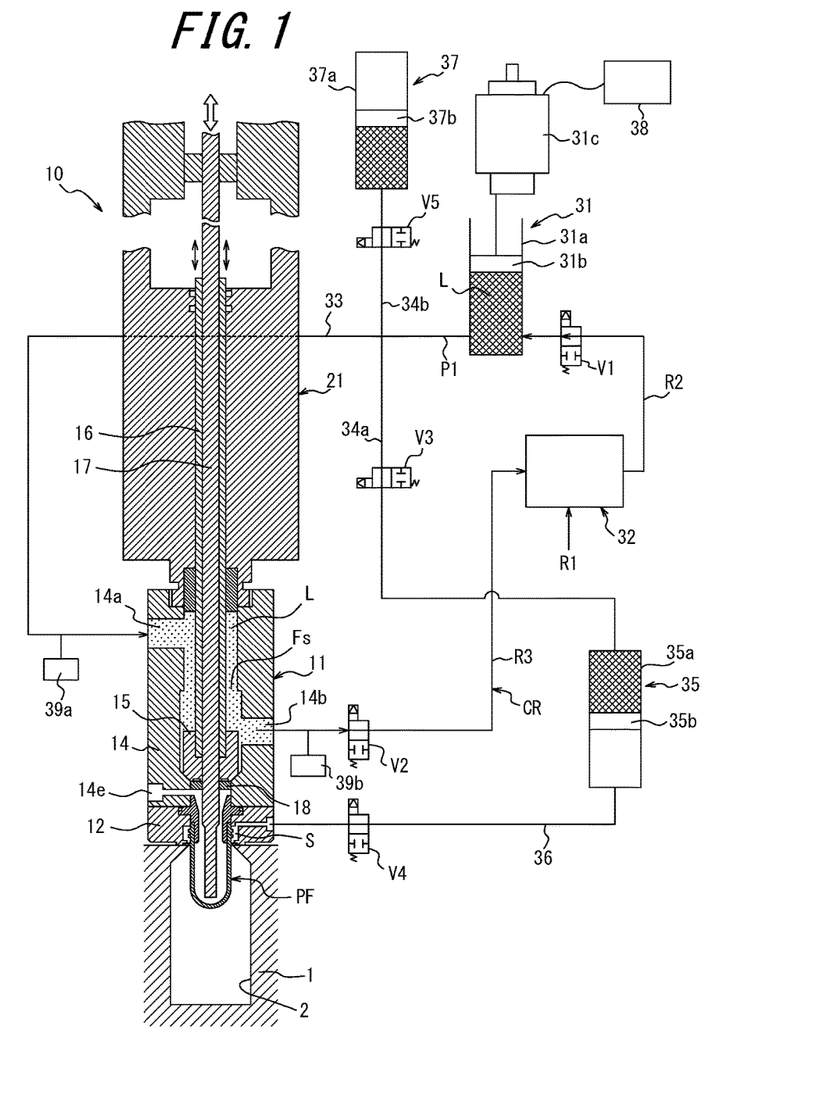
FIG. 1 schematically illustrates a blow molding device according to one of embodiments of the present disclosure.
Figure 2:
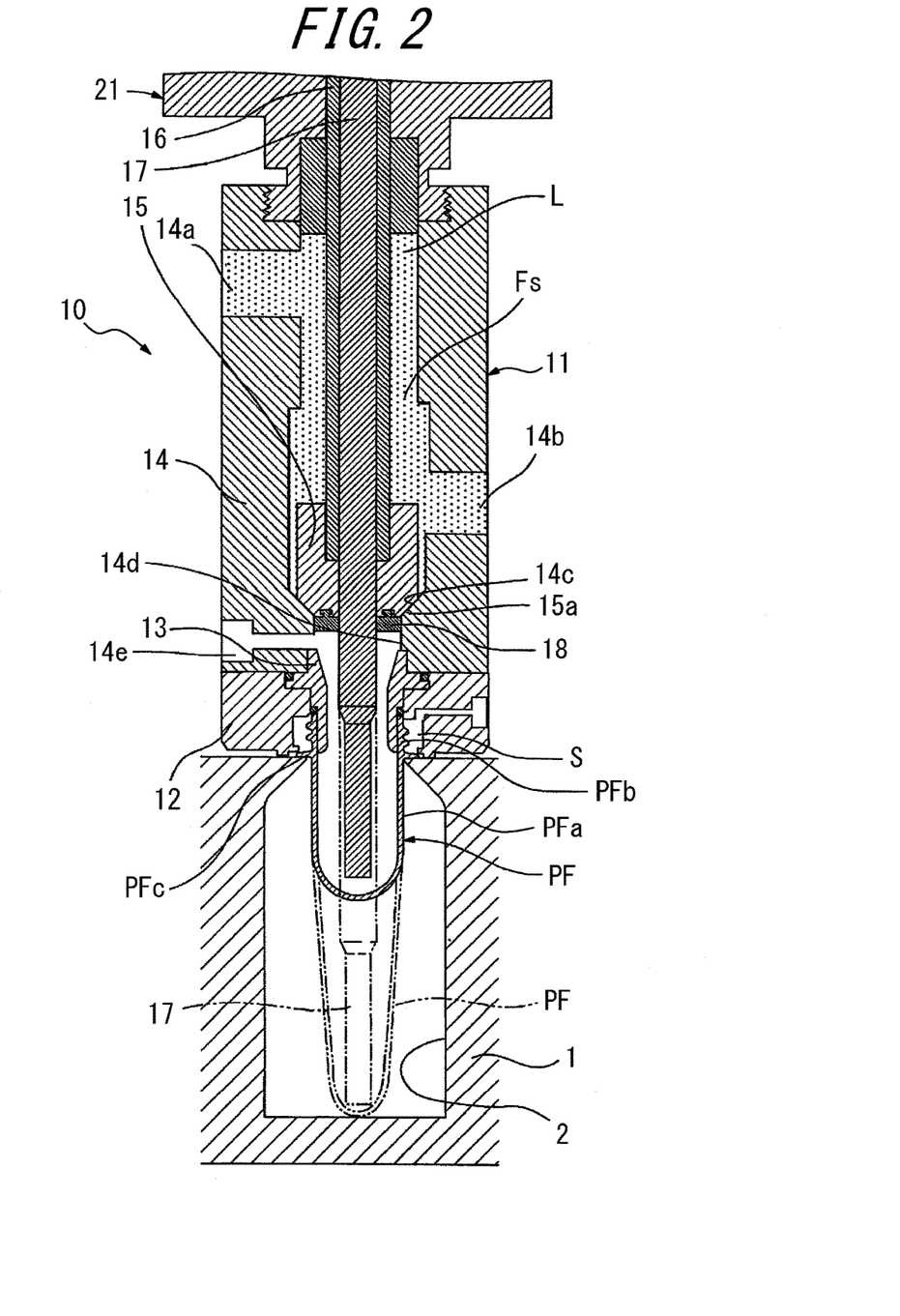
FIG. 2 is an enlarged sectional view of a filling head portion illustrated in FIG. 1.

As illustrated in FIGS. 1 and 2, a blow molding device according to one of embodiments of the present disclosure includes a mold 1 used for blow molding. The mold 1 has a bottle-shaped cavity 2, and the mold 1 is open upward on an upper surface thereof. Although not illustrated in detail, the mold 1 may be opened into right and left mold halves, and a molded product may be removed from the mold 1 by opening the mold 1.

To the mold 1, a preform PF, which is to be blow molded into a bottle by using the blow molding device, may be fitted. FIGS. 1 and 2 illustrate the state where the preform PF is fitted to the mold 1. Examples of the preform PF may include the one which is generally formed in a bottomed cylindrical shape by using a resin material, such as polypropylene (PP) and polyethylene terephthalate (PET), which includes a cylindrical-shaped tubular mouth portion PFb provided unitarily in an upper end of a main body portion PFa having a test tube shape, and which includes a neck ring PFc provided unitarily in a lower end portion of the tubular mouth portion PFb. The preform PF is fitted to the mold 1, with the main body portion PFa being disposed within the cavity 2 of the mold 1 along the axis of the cavity 2, with the neck ring PFc abutting against the upper surface of the mold 1, and with the tubular mouth portion PFb protruding to the outside (upward in FIGS. 1 and 2) of the mold 1.

As illustrated in FIG. 1, on an upper side of the mold 1, a nozzle unit 10 is provided in a manner such that the nozzle unit 10 is freely displaceable in upward and downward directions relative to the mold 1. The nozzle unit 10 generally has a tubular shape and includes a filling head portion 11 and a support portion 21, to which the filling head portion 11 is screw-connected detachably like a cartridge.

As illustrated in FIG. 2, the filling head portion 11 includes a holding member 12, a blow nozzle 13, and a supply tubular portion 14.

The holding member 12 is formed in a block shape provided in the middle thereof with a through hole extending vertically, and the tubular-shaped blow nozzle 13 is fitted on the inner side of the through hole. When the nozzle unit 10 is displaced downward to the lower end, the tubular mouth portion PFb of the preform PF fitted to the mold 1 is located in the through hole, with the blow nozzle 13 being fitted inside the tubular mouth portion PFb, and the neck ring PFc is sandwiched between the lower end of the holding member 12 and the upper surface of the mold 1, and thus, the preform PF is held in a fitted position that is perpendicular to the mold 1.

The supply tubular portion 14 is formed as a cylindrical-shaped member provided inside thereof with a supply path Fs extending vertically. The supply tubular portion 14 is fixed to an upper end of the holding member 12, and the supply tubular portion 14, together with the holding member 12, is displaceable upward and downward relative to the mold 1. The supply tubular portion 14 is provided on an upper end side thereof with an introduction port 14a, which communicates with the supply path Fs, and is also provided on a lower end side thereof with a discharge port 14b, which communicates with the supply path Fs. Furthermore, the supply tubular portion 14 is provided, in a lower end of an inner surface thereof that forms the supply path Fs, with a sealing surface 14c, which has a conical surface shape inclined with a diameter decreasing downward. In the axis of the sealing surface 14c, a supply hole 14d, through which the supply path Fs opens downward into communication with the blow nozzle 13, is also provided.

In the supply path Fs, a sealing body 15, which is configured to open and close the supply hole 14d, and thus, the blow nozzle 13, is disposed. The sealing body 15 is formed in a short cylindrical shape and provided, in an outer peripheral portion of a lower end surface thereof, with a tapered abutment surface 15a. The abutment surface 15a has the same inclination angle as that of the sealing surface 14c, so that the abutment surface 15a may closely contact the sealing surface 14c. In the supply path Fs, a shaft body 16 with a long and narrow cylindrical rod shape is disposed along the axis of the supply path Fs. The shaft body 16 extends through the upper end of the supply tubular portion 14 in a liquid-tight fashion and is supported by the support portion 21 in a manner such that the shaft body 16 is freely displaceable in upward and downward directions with respect to the filling head portion 11 and the support portion 21. The sealing body 15 is coaxially fixed to a lower end of the shaft body 16, and the sealing body 15, together with the shaft body 16, is freely displaceable upward and downward within the supply path Fs. When the shaft body 16 is displaced to the lowermost stroke limit, the abutment surface 15a of the sealing body 15 abuts against the sealing surface 14c provided in the lower end portion of the supply tubular portion 14. Thus, the blow nozzle 13 is closed by the sealing body 15. On the other hand, when the sealing body 15, together with the shaft body 16, is displaced upward, the abutment surface 15a of the sealing body 15 comes off the sealing surface 14c provided in the supply tubular portion 14, and thus, the blow nozzle 13 is opened.

The shaft body 16 is hollow, and a stretching rod 17 is slidably fitted inside the shaft body 16. The stretching rod 17 is displaceable in the axis direction relatively with respect to the shaft body 16, and a lower end of the stretching rod 17 protrudes from a lower end of the sealing body 15. As represented by a two-dot chain line in FIG. 2, the stretching rod 17 may stretch the preform PF in the longitudinal (axial) direction by being displaced downward.

Additionally, in the lower end of the sealing body 15, a short cylindrical-shaped guiding body 18, which is made of polyetheretherketone (PEEK) resin, is fixed to guide the stretching rod 17.

As illustrated in FIG. 1, a plunger pump 31, as the pressurized liquid supply unit, and a liquid circulation unit 32 are connected to the nozzle unit 10.

The plunger pump 31 includes a cylinder 31a and a plunger 31b, which is fitted in the cylinder 31a in a manner such that the plunger 31b is displaceable along the axis direction, and an outlet of the plunger pump 31 is connected to the introduction port 14a, provided in the supply tubular portion 14, through a pipe P1. That is to say, the plunger pump 31 is connected to the blow nozzle 13 via the liquid flow path 33, which includes the pipe P1 and the supply path Fs. Accordingly, by the plunger 31b being actuated, the plunger pump 31 may supply the pressurized liquid L to the blow nozzle 13 via the liquid flow path 33.

In the illustrated example, the plunger pump 31 is a servo plunger-type pump including an electric motor (servo motor) 31c as a driving source, and the plunger 31b is configured to be driven by the electric motor 31c and actuated in the axis direction in the cylinder 31a.

The liquid circulation unit 32 has the functions of regulating the liquid L to a predetermined temperature and supplying the liquid L to the plunger pump 31 through a pipe R2 while additionally supplementing the liquid L from a pipe R1 and of circulating the liquid L between the plunger pump 31 and the supply path Fs while regulating the liquid L to a predetermined temperature. That is to say, the liquid L may be circulated around a circulation path CR formed along the supply path Fs→discharge port 14*b*→pipe R3→liquid circulation unit 32→pipe R2→plunger pump 31→pipe P1→introduction port 14*a*→supply path Fs, as needed.

Two electromagnetic opening-closing valves V1 and V2 of the circulation path CR are disposed in the circulation path CR, and predetermined flow paths are opened and closed by the corresponding opening-closing valves V1 and V2 of the circulation path CR in accordance with processes in blow molding.

The supply tubular portion 14 is provided with a connection port 14*e*, which communicates with the blow nozzle 13 via the supply hole 14*d*. To the connection port 14*e*, a deaeration mechanism configured to remove air that is present within the preform PF prior to blow molding, a mechanism (puff blow mechanism) configured to dispel (flush) the liquid L remaining within the connection port 14*e* by supplying air into the connection port 14*e* momentarily, or the like may be connected.

As illustrated in FIG. 2, the holding member 12 is provided with air space S, which is defined for pressurizing the outside of a mouth and which surrounds an outer circumference of the tubular mouth portion PFb of the preform PF fitted to the mold 1. The air space S, which is defined for pressurizing the outside of the mouth, is sealed space around the outer circumference of the tubular mouth portion PFb, and increasing the pressure inside the air space S, namely, the air pressure to be applied to the outside of the mouth, prevents the diameter increase and deformation of the tubular mouth portion PFb and enhance sealing force between the tubular mouth portion PFb and the blow nozzle 13.

As illustrated in FIG. 1, to increase the air pressure, to be applied to the outside of the mouth, in the air space S, which is defined for pressurizing the outside of the mouth, a cylinder 35, which is used for conversion to air for the outside of the mouth, is disposed between the air space S and the plunger pump 31. The cylinder 35, which is used for conversion to air for the outside of the mouth, includes a cylinder 35*a* and a piston 35*b*, which is disposed in the cylinder 35*a* in a manner such that the piston 35*b* is freely displaceable. The cylinder 35, which is used for conversion to air for the outside of the mouth, has, on one end thereof, in other words, on one end side thereof as defined by the piston 35*b* disposed in the cylinder 35*a*, a cylinder chamber that is connected to the liquid flow path 33, that is to say, the pipe P1, via the first branch path 34*a*, which is branched from the liquid flow path 33. The cylinder 35 also has, on another end thereof, in other words, on another end side thereof as defined by the piston 35*b* disposed in the cylinder 35*a*, another cylinder chamber that is connected to the air space S, which is defined for pressurizing the outside of the mouth, via the pressurizing flow path 36. The cylinder 35, which is used for conversion to air for the outside of the mouth, is actuated by the pressure of the liquid L applied from the plunger pump 31 through the first branch path 34*a* and converts the pressure of the liquid L to the pressure of air in the air space S, which is defined for pressuring the outside of the mouth, to thereby increase the air pressure to be applied to the outer circumference of the tubular mouth portion PFb of the preform PF, that is to say, the air pressure to be applied to the outside of the mouth.

Between the liquid flow path 33 and the cylinder 35, which is used for conversion to air for the outside of the mouth, that is to say, in the first branch path 34*a*, there is also disposed an opening-closing valve V3 of the cylinder 35. In the illustrated example, the opening-closing valve V3 of the cylinder 35, which is used for conversion to air for the outside of the mouth, is configured by a (normally closed) electromagnetic (solenoid) valve, and actuation of the opening-closing valve V3 may be controlled in accordance with turn-on and turn-off to open and close the first branch path 34*a*. Note that FIG. 1 illustrates the opening-closing valve V3 of the cylinder 35, which is used for conversion to air for the outside of the mouth, in its opened state.

On the other hand, between the air space S, which is used for pressurizing air outside the mouth, and the cylinder 35, which is used for conversion to air for the outside of the mouth, that is to say, in the pressurizing flow path 36, there is disposed an opening-closing valve V4, which is used for pressurizing air outside the mouth. In the illustrated example, the opening-closing valve V4, which is used for pressurizing air outside the mouth, is configured by a (normally closed) electromagnetic (solenoid) valve, and actuation of the opening-closing valve V4 may be controlled in accordance with turn-on and turn-off to open and close the pressurizing flow path 36. Note that FIG. 1 illustrates the opening-closing valve V4, which is used for pressurizing air outside the mouth, in its opened state.

Furthermore, to the liquid flow path 33, an accumulator 37 is connected to assist the pressure of the liquid L due to the plunger pump 31. The accumulator 37 includes a cylinder 37*a* and a piston 37*b*, which is disposed in the cylinder 37*a* in a manner such that the piston 37*b* is freely displaceable. The accumulator 37 has, on one end thereof, in other words, on one end side thereof as defined by the piston 37*b* disposed in the cylinder 37*a*, a cylinder chamber that is connected to the second branch path 34*b*, which is branched from the liquid flow path 33. The accumulator 37 also has, on another end side thereof, another cylinder chamber that is sealed. By the piston 37*b* being displaced in the cylinder 37*a* toward the other end side and reducing the volume of the cylinder chamber on the other end side, the accumulator 37 accumulates pressure. Additionally, in the cylinder chamber on the other end side, an elastic body, such as a spring, that urges the piston 37*b* toward the one end side may also be disposed.

Between the liquid flow path 33 and the accumulator 37, that is to say, in the second branch path 34*b*, there is also disposed an opening-closing valve V5 of the accumulator 37. In the illustrated example, the opening-closing valve V5 of the accumulator 37 is configured by a (normally closed) electromagnetic (solenoid) valve, and actuation of the opening-closing valve V5 may be controlled in accordance with turn-on and turn-off to open and close the second branch path 34*b*. Note that FIG. 1 illustrates the opening-closing valve V5 of the accumulator 37 in its opened state.

The present blow molding device includes a control unit 38. The electric motor 31*c* of the plunger pump 31 is connected to the control unit 38, and the control unit 38 controls actuation of the electric motor 31*c*. The control unit 38 may also be configured to perform control in cooperation with a control system that controls actuation of the sealing body 15, the stretching rod 17, the opening-closing valves V1 to V5, and so forth included in the blow molding device or configured as a component of the control system.

In thus configured blow molding device according to the present disclosure, by actuating the plunger pump 31 and by displacing the sealing body 15 upward to open the supply hole 14d, and thus, the blow nozzle 13, the pressurized liquid L is supplied (filled) from the plunger pump 31 into the preform PF through the blow nozzle 13, and accordingly, the preform PF is blow molded into a shape conforming to the cavity 2 of the mold 1.

Furthermore, in the present blow molding device, by actuating the plunger pump 31, the air pressure, to be applied to the outside of the mouth, may be accumulated in the cylinder 35, which is used for conversion to air for the outside of the mouth, in advance before the supply of the liquid L into the preform PF. That is to say, the plunger pump 31 is actuated in the state where the blow nozzle 13 is closed by the sealing body 15, where the opening-closing valves V1 and V2 of the circulation path CR are closed to stop circulation of the liquid L, where the opening-closing valve V3 of the cylinder 35, which is used for conversion to air for the outside of the mouth, is opened, and where the opening-closing valve V4, which is used for pressurizing air outside the mouth, is closed, and in response to the actuation of the plunger pump 31, the cylinder 35 is actuated to increase air pressure in the pressurizing flow path 36. In this state, the opening-closing valve V3 of the cylinder 35, which is used for conversion to air for the outside of the mouth, is closed, and thus, the pressure is accumulated in the cylinder 35 in advance.

Then, during blow molding where the pressurized liquid L is supplied into the preform PF through the blow nozzle 13 by actuating the plunger pump 31 and opening the sealing body 15, the opening-closing valve V4, which is used for pressurizing air outside the mouth, is opened while the opening-closing valve V3 of the cylinder 35, which is used for conversion to air for the outside of the mouth, remains closed. This allows the increased pressure in the pressurizing flow path 36 to be supplied to the air space S, which is defined for pressurizing the outside of a mouth, thereby increasing the air pressure in the air space S, that is to say, the air pressure to be applied to the outside of the mouth. Thus, during blow molding of the preform PF, the air pressure in the air space S, which is defined for pressurizing the outside of the mouth, is increased, and accordingly, diameter increase and deformation of the tubular mouth portion PFb are prevented.

By thus increasing the air pressure, to be applied to the outside of the mouth, in the air space S, which is defined for pressurizing the outside of the mouth, with use of the cylinder 35, which is used for conversion to air for the outside of the mouth and which accumulates therein the pressure in response to the actuation of the plunger pump 31, there is no need to additionally provide a driving unit or the like that drives a cylinder configured to increase the pressure in the air space S. This simplifies the configuration of the blow molding device, and accordingly, reduces manufacturing cost of a bottle molded by the blow molding device.

Furthermore, in the present blow molding device, by actuating the plunger pump 31, the air pressure, to assist pressurization of the liquid, may be accumulated in the accumulator 37 in advance before the supply of the liquid L into the preform PF. That is to say, the plunger pump 31 is actuated in the state where the blow nozzle 13 is closed by the sealing body 15, where the opening-closing valves V1 and V2 of the circulation path CR are closed to stop circulation of the liquid L, and where the opening-closing valve V5 of the accumulator 37 is opened, and, with the liquid pressure increased in response to the actuation of the plunger pump 31, the accumulator 37 is actuated so that the piston 37b is displaced toward the other end side. After that, the opening-closing valve V5 of the accumulator 37 is closed, and thus, the pressure is accumulated in the accumulator 37 in advance. Additionally, the operation of accumulating pressure in the accumulator 37 is preferably performed simultaneously with the operation of accumulating the pressure in the cylinder 35, which is used for conversion to air for the outside of the mouth.

Then, during blow molding where the pressurized liquid L is supplied into the preform PF through the blow nozzle 13 by actuating the plunger pump 31 and opening the sealing body 15, the opening-closing valve V5 of the accumulator 37 is opened. This allows the pressure accumulated in the accumulator 37 to be applied to the liquid L supplied into the preform PF, thereby assisting pressurization of the liquid L. Consequently, the liquid L supplied into the preform PF is pressurized to the prescribed peak pressure more quickly, compared with cases where the liquid L is pressurized solely by the plunger pump 31. At this time, the opening of the opening-closing valve V5 of the accumulator 37 may be timed to occur immediately before the opening of the sealing body 15 and to last until before the liquid L supplied into the preform PF reaches the prescribed peak pressure, and by doing so, the liquid L is pressurized to the prescribed peak pressure efficiently and quickly.

Additionally, pressure sensors 39a and 39b are respectively connected to the pipe P1 and the pipe R3 to detect the pressure of the liquid L supplied into the preform PF.

In this way, accumulating the pressure in the accumulator 37 in advance and pressurizing, at the time of supplying the pressurized liquid L into the preform PF, the liquid not only by actuating the plunger pump 31 but also by applying the accumulated pressure within the accumulator 37 to the liquid L provides the following advantageous effect. That is to say, the time period necessary for pressurizing the liquid L supplied into the preform supply to the prescribed pressure is reduced to less than the time period corresponding to the capability of the plunger pump 31, and accordingly, moldability of the bottle obtained as a result of blow molding the preform PF is enhanced compared with cases where the liquid L is pressurized solely by the plunger pump 31.

Furthermore, the cylinder 35, which is used for conversion to air for the outside of the mouth, is provided as a separate system from the accumulator 37 and is disconnected from the liquid flow path 33 during the supply of the liquid L into the preform PF. Accordingly, even though the accumulator 37 is configured to assist pressurization of the liquid L supplied into the preform PF, the air pressure, to be applied to the outside of the mouth, that the cylinder 35, which is used for conversion to air for the outside of the mouth, applies to the air space S, which is defined for pressuring the outside of the mouth, remains constant. Thus, the air pressure, to be applied to the outside of the mouth, that the cylinder 35, which is used for conversion to air for the outside of the mouth, applies to the air space S, which is defined for pressuring the outside of the mouth, helps ensure that the diameter increase and deformation of the tubular mouth portion of the preform are prevented.

Figure 3:
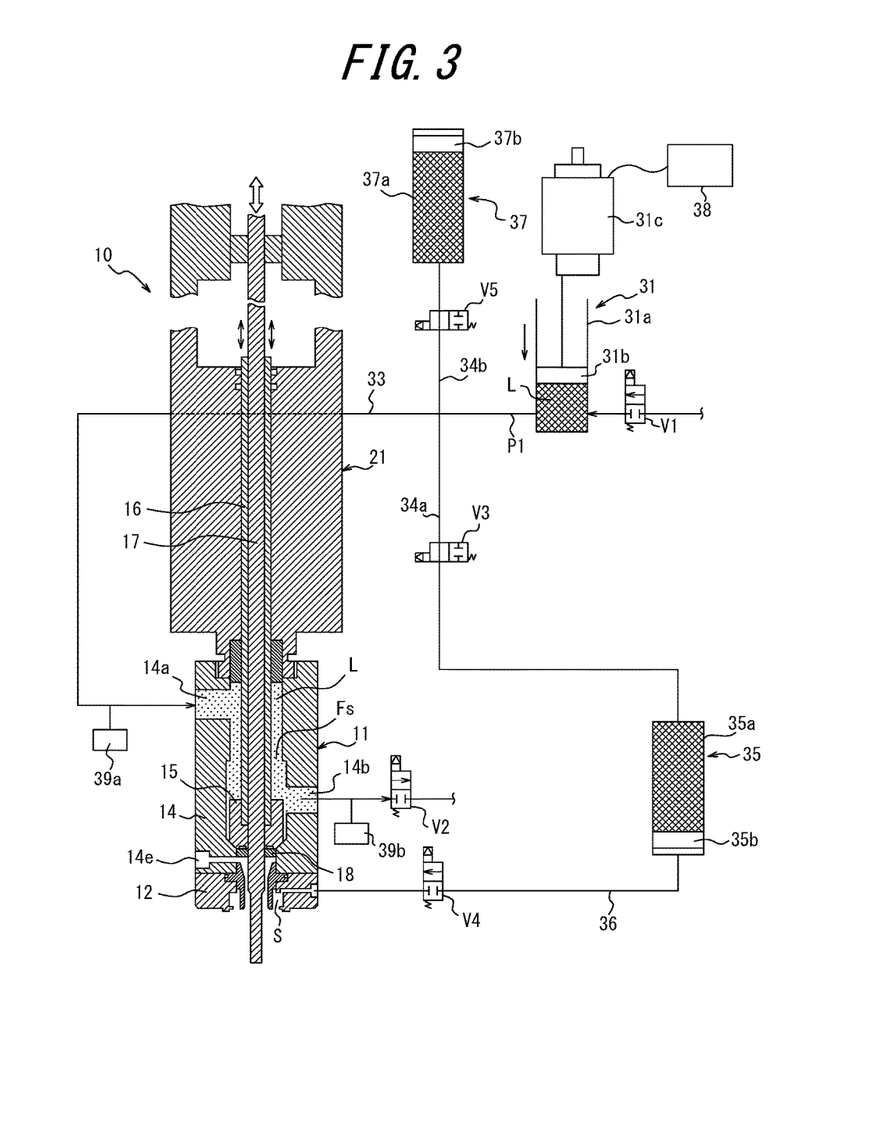
FIG. 3 illustrates the state where air pressure to be applied to an outside of a mouth is accumulated in a cylinder used for conversion to air for the outside of the mouth and where assist pressure is accumulated in an accumulator.
Figure 4:
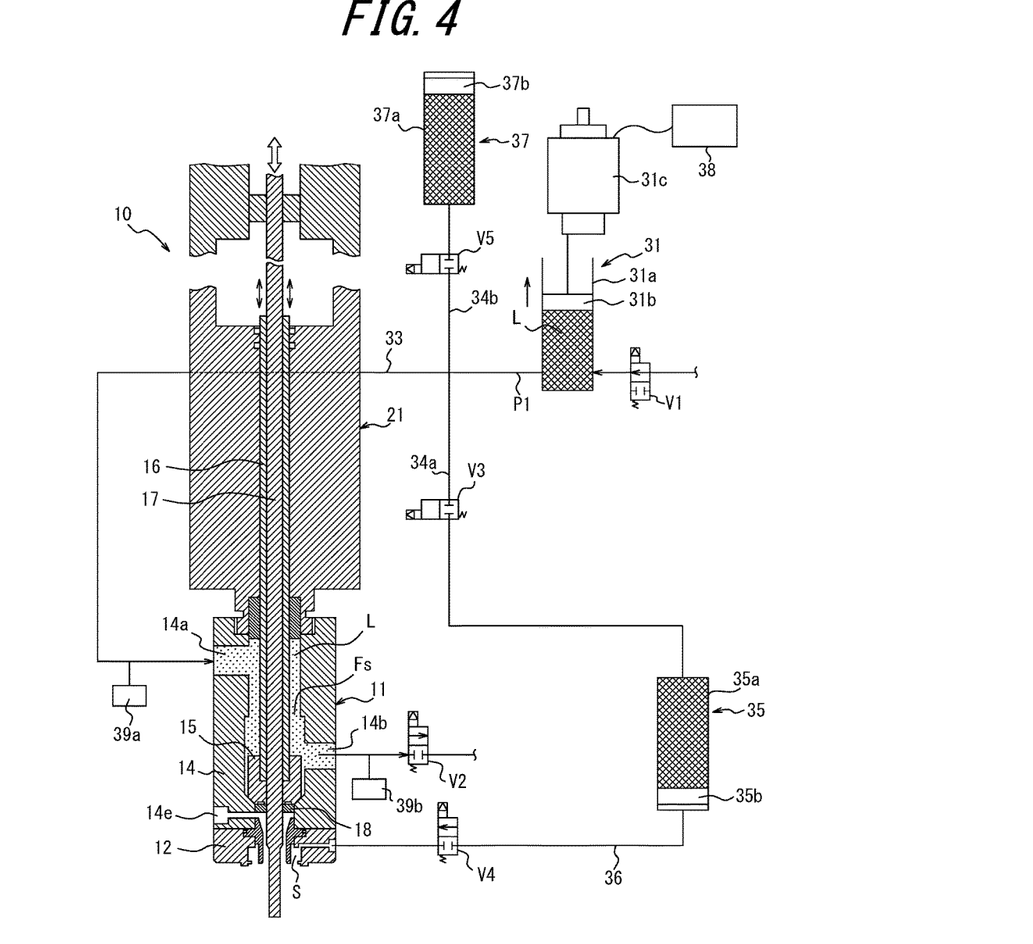
FIG. 4 illustrates the state where liquid is supplied to a plunger pump after air pressure to be applied to an outside of a mouth is accumulated in a cylinder used for conversion to air for the outside of the mouth and after assist pressure is accumulated in an accumulator.
Figure 5:
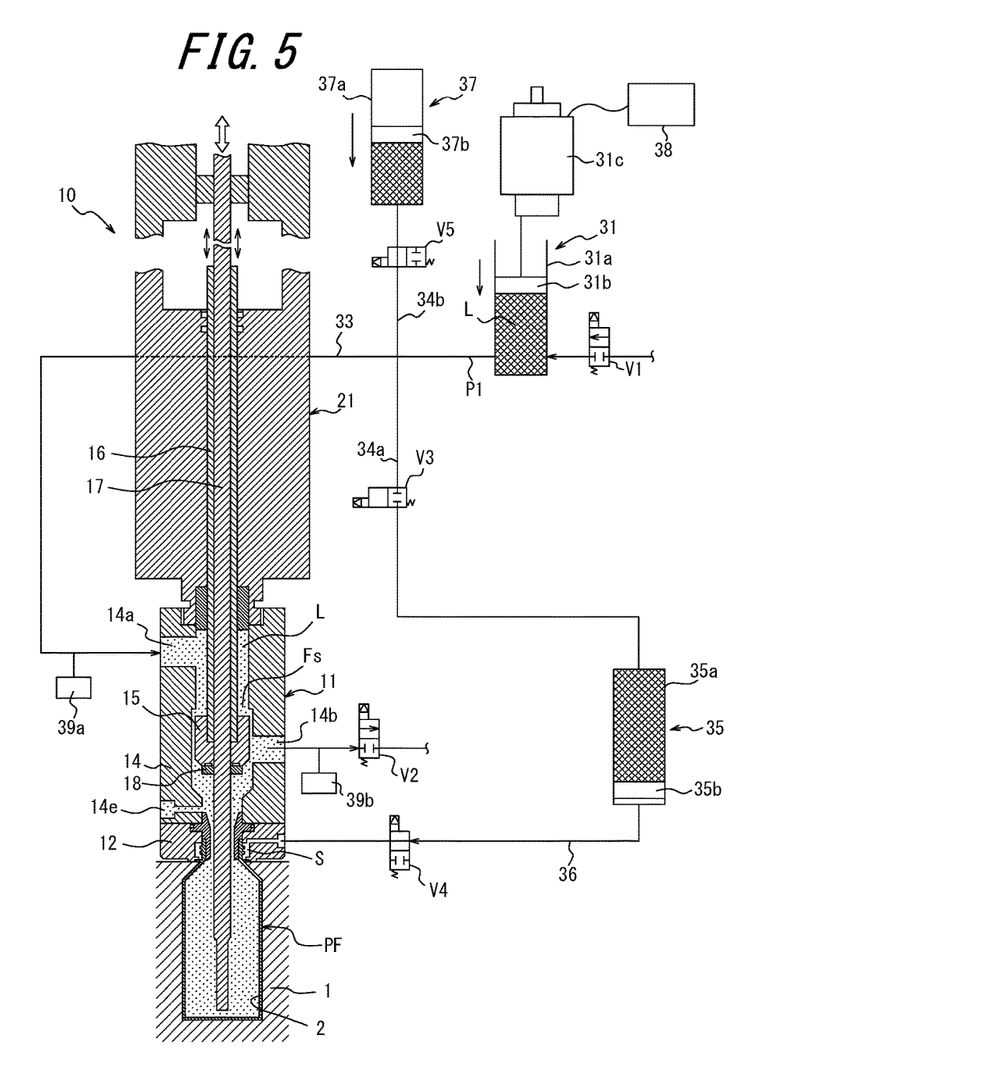
FIG. 5 illustrates the state of blow molding where pressurized liquid is supplied into a preform.

FIG. 3 illustrates the state where air pressure to be applied an outside of a mouth is accumulated in a cylinder used for conversion to air for the outside of the mouth and where assist pressure is accumulated in an accumulator. FIG. 4 illustrates the state where liquid is supplied to a plunger pump after air pressure to be applied to an outside of a mouth is accumulated in a cylinder used for conversion to air for the outside of the mouth and after assist pressure is accumulated in an accumulator. FIG. 5 illustrates the state of blow molding where pressurized liquid is supplied into a preform.

Figure 6:
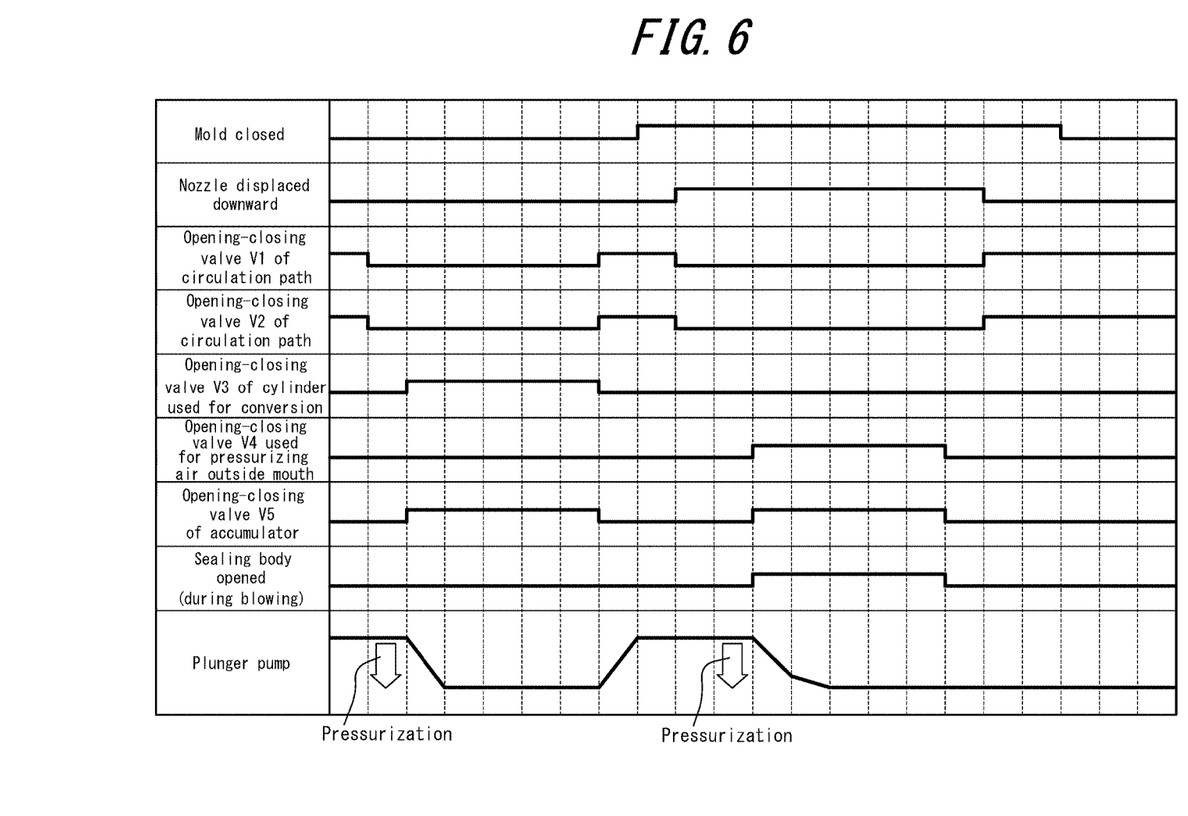
FIG. 6 is a time chart illustrating a procedure of operation of a blow molding device illustrated in FIG. 1.

Subsequently, with reference to FIGS. 3 to 5 as needed, a description is given of a procedure for blow molding the preform PF into a bottle by using such a blow molding device. Additionally, FIG. 6 is a time chart illustrating a procedure of operation of a blow molding device. In the time chart of FIG. 6, the row "mold closed" represents, when the line is in an upper part of the row, that the mold 1 is closed, and the row "nozzle displaced downward" represents, when the line is in an upper part of the row, that the nozzle unit 10 is displaced downward in abutment with the mold 1, the rows "opening-closing valves V1 to V5" and "sealing body opened" each represent, when the corresponding line is in un upper part of the row, that the corresponding valve or sealing body is opened, and the row "plunger pump" represents, when the line is shifted downward, pressurization of the liquid L by the plunger pump 31.

As illustrated in FIG. 3, in the blow molding device, firstly, in the state where the mold 1 is opened, where the nozzle unit 10 is displaced upward, and where the opening-closing valve V3 of the cylinder 35, which is used for conversion to air for the outside of the mouth, the opening-closing valve V4, which is used for pressurizing air outside the mouth, and the opening-closing valve V5 of the accumulator 37 are closed, the opening-closing valves V1 and V2 of the circulation path CR are opened, and the liquid L is supplied to the plunger pump 31. Subsequently, after the supply of the liquid L to the plunger pump 31 is stopped by closing the opening-closing valves V1 and V2 of the circulation path CR, the opening-closing valve V3 of the cylinder 35, which is used for conversion to air for the outside of the mouth, and the opening-closing valve V5 of the accumulator 37 are opened, while the opening-closing valves V1 and V2 of the circulation path CR and the opening-closing valve V4, which is used for pressurizing air outside the mouth, remain closed, and the plunger pump 31 is actuated. Consequently, the pressure of the liquid L supplied from the plunger pump 31 is applied to the cylinder 35, which is used for conversion to air for the outside of the mouth, and to the accumulator 37, and the pressures in the cylinder 35 and the accumulator 37 are increased. Then, in this state, the opening-closing valve V3 of the cylinder 35, which is used for conversion to air for the outside of the mouth, and the opening-closing valve V5 of the accumulator 37 are closed. This allows predetermined values of pressure to be accumulated in the cylinder 35, which is used for conversion to air for the outside of the mouth, and in the accumulator 37.

Subsequently, as illustrated in FIG. 4, the opening-closing valves V1 and V2 of the circulation path CR are opened to cause reverse actuation of the plunger pump 31 in a suck direction, to thereby supply additional liquid L from the liquid circulation unit 32 to the plunger pump 31. At this time, the sealing body 15, the opening-closing valve V3 of the cylinder 35, which is used for conversion to air for the outside of the mouth, the opening-closing valve V4, which is used for pressurizing air outside the mouth, and the opening-closing valve V5 of the accumulator 37 remain closed.

Subsequently, the preform PF which, except for the tubular mouth portion PFb, is heated to a temperature suitable for blow molding is fitted to the mold 1 used for blow molding, with the tubular mouth portion PFb being protruded upward, and the mold 1 is closed.

At this time, with the opening-closing valves V1 and V2 of the circulation path CR being opened, the liquid L may be circulated through the circulation path CR while being regulated to the predetermined temperature by the liquid circulation unit 32. This state is illustrated in FIG. 1.

Then, the nozzle unit 10 is displaced downward so that the neck ring PFc is sandwiched between the holding member 12 and the upper surface of the mold 1 and that the preform PF is held to the mold 1. After the preform PF is held to the mold 1, the opening-closing valves V1 and V2 of the circulation path CR are closed to stop circulation of the liquid L around the circulation path CR.

Since the blow molding device in the present embodiment includes the stretching rod 17, as represented by the two-dot chain line in FIG. 2, the stretching rod 17 is displaced downward toward the preform PF held to the mold 1, so that the stretching rod 17 stretches the preform PF in the longitudinal (axial) direction.

While or after the preform PF is stretched in the longitudinal (axial) direction by the stretching rod 17, the sealing body 15, together with the shaft body 16, is displaced upward to open the supply hole 14d, and thus, the blow nozzle 13. Furthermore, once the sealing body 15 starts the opening movement, the control unit 38 controls the electric motor 31c to be activated, which in turn causes the plunger 31b to start to actuate. Consequently, the pressurized liquid L pressure-fed from the plunger pump 31 is supplied into the preform PF through the supply hole 14d and the blow nozzle 13 for blow molding the preform PF. This state is illustrated in FIG. 5.

Furthermore, during blow molding where the pressurized liquid L is supplied into the preform PF by the sealing body 15 being opened, the opening of the opening-closing valve V5 of the accumulator 37 may be timed to occur immediately before the opening of the sealing body 15 and to last until before the pressure of the liquid L supplied into the preform PF is increased to the prescribed peak pressure, and by doing so, the assist pressure accumulated in the accumulator 37 is applied to the liquid L flowing in the liquid flow path 33, that is to say, the liquid L to be supplied into the preform PF, via the second branch path 34b. Consequently, the liquid L supplied into the preform PF is pressurized to the prescribed peak pressure more quickly by the pressure applied from the accumulator 37, compared with cases where the liquid L is pressurized solely by the plunger pump 31. Accordingly, shaping characteristics of the blow molded bottle are enhanced, and the shrinkage rate of the bottle resulting from molding is reduced to increase a capacity of the bottle. Thus, moldability of the bottle by using the blow molding device is enhanced.

That is to say, the blow molding device according to the present disclosure accumulates the pressure in the accumulator 37 in advance by actuating the plunger pump 31 before the supply of the liquid L into the preform PF, and then, when supplying the pressurized liquid L into the preform PF, opens the valve V5 of the accumulator 37 and applies the accumulated pressure within the accumulator 37 to the liquid L to be supplied into the preform PF. Accordingly, the time period necessary for pressurizing the liquid L to the prescribed pressure is reduced, and moldability of a bottle is enhanced.

Furthermore, during blow molding where the pressurized liquid L is supplied into the preform PF by the sealing body 15 being opened, the blow molding device according to the present disclosure opens the opening-closing valve V4, which is used for pressurizing air outside the mouth, while still closing the opening-closing valve V3 of the cylinder 35, which is used for conversion to air for the outside of the mouth. This allows the pressure in the pressurizing flow path 36 that is increased by the cylinder 35 to be supplied to the air space S, which is defined for pressurizing the outside of the mouth, thereby increasing the air pressure, to be applied to the outside of the mouth, in the air space S. Consequently, the pressure in the air space S, which is defined for pressurizing the outside of the mouth and surrounding the outer circumference of the tubular mouth portion PFb, is maintained to be higher than the pressure within the preform PF, that is to say, within a bottle formed by blow molding the preform PF, when the pressurized liquid L is supplied into the preform PF. Thus, the diameter increase and deformation of the tubular mouth portion PFb are prevented. Preventing the diameter increase and deformation of the tubular mouth portion PFb in turn prevents the liquid L from leaking to the outside from a gap defined between the tubular mouth portion PFb and the blow nozzle 13.

By blow molding as described above, the preform PF is expanded and stretched in the lateral (radial) direction by using the pressure of the liquid L supplied from the plunger pump 31 and is molded into a bottle having a shape conforming to the cavity 2 of the mold 1.

Additionally, after blow molding, as needed, a suck back process of actuating the plunger 31b of the plunger pump 31 in the return direction to suck in the liquid L through the supply hole 14d may also be performed to regulate the amount of the liquid L to be filled.

Once blow molding is completed, the sealing body 15, the opening-closing valve V4, which is used for pressurizing air outside the mouth, and the opening-closing valve V5 of the accumulator 37 are closed. Subsequently, the nozzle unit 10 is displaced upward, and the blow nozzle 13 is detached from the mouth of the bottle resulting from blow molding, and the opening-closing valves V1 and V2 of the circulation path CR are opened to start circulation around the circulation path CR again. Then, the mold 1 is opened to eject a product, which contains the liquid L as the content liquid in the bottle.

Table 1 shows results of comparison regarding time periods necessary for the liquid L supplied into the preform PF to reach the peak pressure, average values of the capacities of bottles formed by blow molding, and shrinkage rates of the bottles, between blow molding using the blow molding device according to the present disclosure, that is to say, using the assist of the accumulator 37 for pressurization of the liquid L, and blow molding according to a comparative example without using the assist.

TABLE 1

|  | Without assist | With assist |
| --- | --- | --- |
| Time period (second) to peak pressure | 0.23 | 0.19 |
| Average value (ml) of capacity of bottle | 376.8 | 383.2 |
| Shrinkage rate (%) | 2.21 | 0.44 |

As shown in Table 1, blow molding using the blow molding device according to the present disclosure reduces the time period necessary for the liquid L supplied into the preform PF to be pressurized to the prescribed peak pressure, and accordingly, increases the capacity of the bottle and reduces the shrinkage rate of the bottle, thereby enhancing moldability of the bottle.

Figure 7:
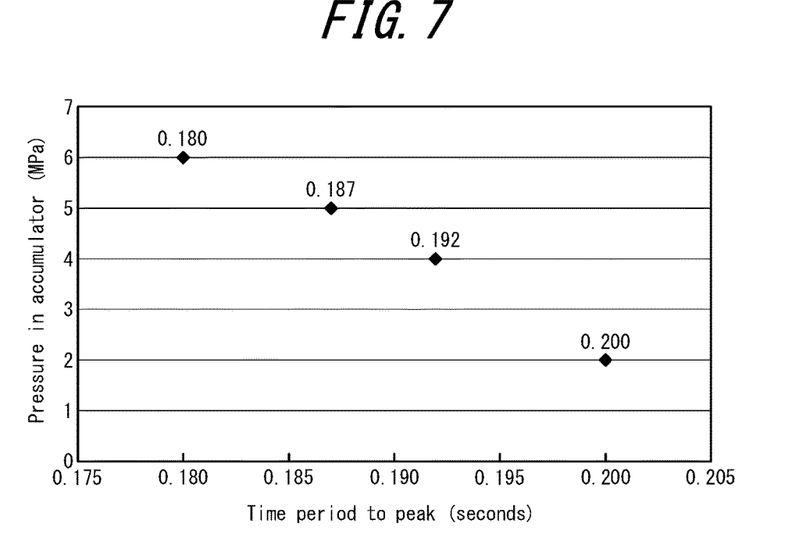
FIG. 7 illustrates a relation between time period necessary for liquid supplied into a preform to reach a peak pressure and pressure accumulated in an accumulator.

FIG. 7 illustrates a relation between time period necessary for liquid supplied into a preform to reach a peak pressure and pressure accumulated in an accumulator.

FIG. 7 indicates that the time period necessary for the liquid L to be pressurized to the peak pressure is reduced to 0.200 seconds, 0.192 seconds, 0.187 seconds, and 0.180 seconds, as the pressure accumulated in the accumulator 37 in advance before the supply of the liquid L into the preform PF is increased to 2 MPa, 4 MPa, 5 MPa, and 6 MPa. By thus increasing the pressure accumulated in the accumulator 37 in advance before the supply of the liquid L into the preform PF, the time period necessary for the liquid L to be pressurized to the peak pressure is reduced. Accordingly, by setting the pressure accumulated in the accumulator 37 in advance to be a given value in accordance with the pressurizing capability of the plunger pump 31, the time period necessary for the liquid L to be pressurized to the peak pressure may be set to a desired value, and moldability of the bottle may be enhanced.

Figure 8A:
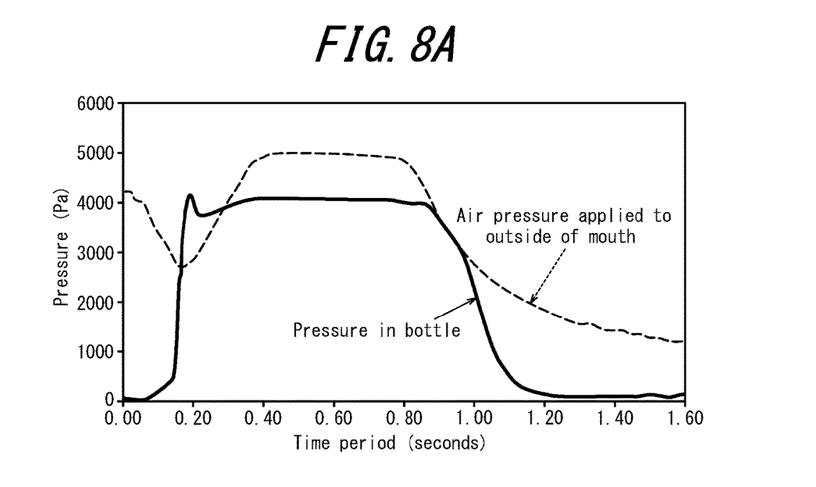
FIGS. 8A and 8B are characteristic line diagrams illustrating relations between pressure of liquid supplied into a preform and air pressure applied to an outside of a mouth according to a comparative example and according to the present disclosure, respectively.
Figure 8B:
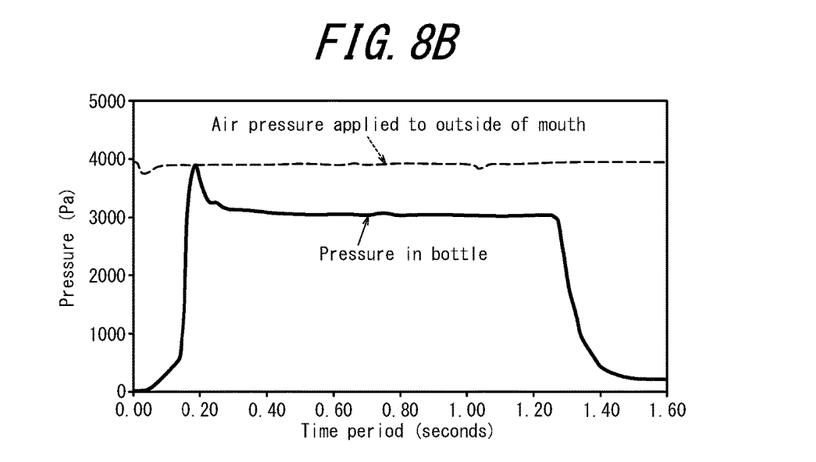

FIGS. 8A and 8B are characteristic line diagrams illustrating relations between pressure of liquid supplied into a preform and air pressure applied to an outside of a mouth according to a comparative example, where an opening-closing valve of a cylinder used for conversion to air for the outside of the mouth is opened during blow molding, and according to the present disclosure, where the opening-closing valve of the cylinder remains closed during blow molding, respectively.

The blow molding device described above may be configured to assist pressurization of the liquid L supplied into the preform PF by the pressure accumulated in the cylinder 35 in advance, by opening the opening-closing valve V4, which is used for pressurizing air outside the mouth, and the opening-closing valve V3 of the cylinder 35, which is used for conversion to air for the outside of the mouth, during blow molding where the pressurized liquid L is supplied into the preform PF from the plunger pump 31. A blow molding device with such a configuration according to the comparative example may assist pressurization of the liquid L and may also pressurize the air space S, which is defined for pressurizing the outside of the mouth, by the single cylinder 35, which is used for conversion to air for the outside of the mouth, without disposing the accumulator 37.

However, in the blow molding device according to the above comparative example, as the pressure accumulated in advance in the cylinder 35, which is used for conversion to air for the outside of the mouth, is applied to the liquid L supplied into the preform PF, the pressure of the cylinder 35, that is to say, the pressure in the air space S, which is defined for pressurizing the outside of the mouth and which is pressurized by the cylinder 35, is decreased. As illustrated in FIG. 8A, this temporarily makes the pressure of the liquid L supplied into the preform PF, that is to say, the pressure in a bottle as a result of molding, greater than the pressure, to be applied to the outside of the mouth, in the air space S, which is defined for pressuring the outside of the mouth, thus resulting in the diameter increase and deformation of the tubular mouth portion PFb of the preform PF as a possible cause of leakage of the liquid L from the gap defined between the tubular mouth portion PFb and the blow nozzle 13.

In contrast, as illustrated in FIG. 8B, the blow molding device according to the present disclosure always maintains the pressure, to be applied to the outside of the mouth, in the air space S, which is defined for pressuring the outside of the mouth, to be greater than the pressure within the bottle during blow molding, by opening the opening-closing valve V4, which is used for pressurizing air outside the mouth, in the state where the opening-closing valve V3 of the cylinder 35, which is used for conversion to air for the outside of the mouth, is closed and where the cylinder 35 is disconnected from the liquid flow path 33 during blow molding. Thus, in the blow molding device according to the present disclosure, the pressure that the cylinder 35, which is used for conversion to air for the outside of the mouth, applies to the air space S, which is defined for pressurizing the outside of the mouth, is maintained to be constant while the liquid L supplied into the preform PF is pressurized by the accumulator 37. This ensures that the diameter increase and deformation of the tubular mouth portion PFb of the preform PF are prevented.

Needless to say, the present disclosure is not limited to the above embodiment, and various changes may be made without departing the gist of the present disclosure.

For example, in the above embodiment, the plunger pump 31 is actuated in the state where the blow nozzle 13 is closed by the sealing body 15, where the opening-closing valves V1 and V2 of the circulation path CR are closed, and where the opening-closing valve V5 of the accumulator 37 is opened, and by doing so, the pressurized liquid L is supplied from the plunger pump 31 to the accumulator 37, and the pressure is accumulated in the accumulator 37 in advance. However, the present disclosure is not limited to this embodiment, and a pressurizing unit that pressurizes the accumulator 37 may be disposed, and the pressure may be accumulated in the accumulator 37 in advance by the pressurizing unit as a separate system from the liquid L supplied from the plunger pump 31. In this case, any apparatus, such as an electric motor (servo motor), a hydraulic cylinder, and an air cylinder, which may accumulate the pressure in the accumulator 37 may be employed as the pressurizing unit. There may also be provided a liquid supplement path through which the liquid L may be supplemented to the cylinder 37a included in the accumulator 37, as a separate system from the liquid circulation unit 32, and the pressure may be accumulated in the accumulator 37 by driving the piston 37b included in the accumulator 37 while the opening-closing valve V5 of the accumulator 37 remains closed.

Moreover, although in the above embodiment the pressure is accumulated in the cylinder 35, which is used for conversion to air for the outside of the mouth, and in the accumulator 37 before the closing of the mold 1 and the downward displacement of the nozzle unit 10, it is also possible to accumulate the pressure in the cylinder 35 and in the accumulator 37 after setting up the mold 1 by closing the mold 1 to which the preform PF is fitted and displacing the nozzle unit 10 downward.

Moreover, although in the above embodiment the plunger pump 31 is a servo plunger-type pump including the plunger 31b driven by the electric motor 31c, the present disclosure is not limited to this embodiment, and the plunger 31b may also be configured to be driven by any other driving mechanism, such as a hydraulic cylinder and an air cylinder.

Moreover, although in the above embodiment the liquid L is circulated around the circulation path CR, the present disclosure is not limited to this embodiment, and the liquid L does not need to be circulated as long as the pressurized liquid L may be supplied from the plunger pump 31 into the preform PF through the liquid flow path 33 and the blow nozzle 13.

Moreover, the preform PF may be expanded and stretched in both the longitudinal (axial) and the lateral (radial) direction into a bottle having a shape conforming to the cavity 2 of the mold 1 by using only the pressure caused by the liquid L supplied from the plunger pump 31 without using the stretching rod 17.

Moreover, as the preform PF, the one with a shape including the main body portion PFa and the tubular mouth portion PFb and not including the neck ring PFc may also be used. Moreover, the material of the preform PF is not limited to polypropylene, and any other resin material, such as polyethylene terephthalate, may be used.

The invention claimed is:

1. A blow molding device that supplies a pressurized liquid into a bottomed tubular preform fitted to a mold used for blow molding the preform into a shape conforming to a cavity of the mold, the blow molding device comprising:
   a blow nozzle fitted to a tubular mouth portion of the preform;
   a sealing body configured to open and close the blow nozzle;
   a pressurized liquid supply unit connected to the blow nozzle via a liquid flow path;
   a cylinder configured to convert liquid pressure into air pressure, the cylinder having one end that is in branch connection with the liquid flow path and another end that is in connection with an air space surrounding an outer circumference of the tubular mouth portion of the preform when fitted to the mold, the cylinder configured to pressurize the air space with air;
   a cylinder opening-closing valve disposed between the liquid flow path and the cylinder;
   an air pressure opening-closing valve disposed between the air space and the cylinder;
   wherein by actuating the pressurized liquid supply unit in a state where the sealing body and the air pressure opening-closing valve are closed and where the cylinder opening-closing valve is opened, and wherein by subsequently closing the cylinder opening-closing valve pressure is accumulated in advance in the cylinder, and
   when the pressurized liquid is supplied into the preform through the blow nozzle by actuating the pressurized liquid supply unit and by opening the sealing body, the air pressure opening-closing valve is opened while the cylinder opening-closing valve remains closed to thereby allow the accumulated pressure within the cylinder to pressurize the air space.

2. The blow molding device of claim 1, further comprising an accumulator and an accumulator opening-closing valve, the accumulator being in branch connection with the liquid flow path and the accumulator opening-closing valve being disposed between the liquid flow path and the accumulator, wherein the pressure is accumulated in the accumulator in advance by bringing the accumulator opening-closing valve into an opened state at the time of accumulating the pressure in advance in the cylinder through the actuation the pressurized liquid supply unit and by subsequently closing the accumulator opening-closing valve, and whereby when the pressurized liquid is supplied into the preform through the blow nozzle by actuating the pressurized liquid supply unit and by opening the sealing body, the accumulator opening-closing valve is opened to thereby apply the accumulated pressure within the accumulator to the liquid supplied into the preform.

3. The blow molding device of claim 1, further comprising:
   an accumulator and an accumulator opening-closing valve, the accumulator being in branch connection with the liquid flow path and the accumulator opening-closing valve being disposed between the liquid flow path and the accumulator, and a pressurizing unit configured to pressurize the accumulator, wherein pressure is accumulated in the accumulator by the pressurizing unit in advance of the pressurized liquid being supplied into the preform through the blow nozzle by actuating the pressurized liquid supply unit and by opening the sealing body.

4. The blow molding device according to claim 3, wherein the pressurized liquid supply unit comprises a servo motor plunger pump.

5. The blow molding device according to claim 2, wherein the pressurized liquid supply unit comprises a servo motor plunger pump.

6. The blow molding device according to claim 1, wherein the pressurized liquid supply unit comprises a servo motor plunger pump.

7. A blow molding device that supplies a pressurized liquid into a bottomed tubular preform fitted to a mold used for blow molding the preform into a shape conforming to a cavity of the mold, the blow molding device comprising:
- a blow nozzle fitted to a tubular mouth portion of the preform;
- a sealing body configured to open and close the blow nozzle;
- a pressurized liquid supply unit connected to the blow nozzle via a liquid flow path;
- an accumulator in branch connection with the liquid flow path,
- an accumulator opening-closing valve disposed between the liquid flow path and the accumulator, and
- wherein pressure is accumulated in the accumulator in advance by one of bringing the accumulator opening-closing valve into an opened state during actuation the pressurized liquid supply unit and with the sealing body closed and subsequently closing the accumulator opening-closing valve or by a pressurizing unit configured to pressurize the accumulator, and
- whereby, when the pressurized liquid is supplied into the preform through the blow nozzle by actuating the pressurized liquid supply unit and by opening the sealing body, the accumulator opening-closing valve is opened to thereby apply the accumulated pressure within the accumulator to the liquid supplied into the preform.

8. The blow molding device of claim 7, further comprising:
- a cylinder configured to convert liquid pressure into air pressure, the cylinder having one end that is in branch connection with the liquid flow path and another end that is in connection with an air space surrounding an outer circumference of the tubular mouth portion of the preform when fitted to the mold, the cylinder configured to pressurize the air space with air; and
- a cylinder opening-closing valve disposed between the liquid flow path and the cylinder.

9. The blow molding device of claim 8, wherein by actuating the pressurized liquid supply unit in a state where the sealing body and the air pressure opening-closing valve are closed and where the cylinder opening-closing valve is opened, and wherein by subsequently closing the cylinder opening-closing valve, pressure is accumulated in advance in the cylinder, and when the pressurized liquid is supplied into the preform through the blow nozzle by actuating the pressurized liquid supply unit and by opening the sealing body, the air pressure opening-closing valve is opened while the cylinder opening-closing valve remains closed to thereby allow the accumulated pressure within the cylinder to pressurize the air space.

10. The blow molding device according to claim 7, wherein the pressurized liquid supply unit comprises a servo motor plunger pump.

* * * * *